Nov. 12, 1968        A. K. BROWN, JR        3,410,570
                STEERING CONTROL MECHANISM
Filed Jan. 12, 1967                    2 Sheets-Sheet 2
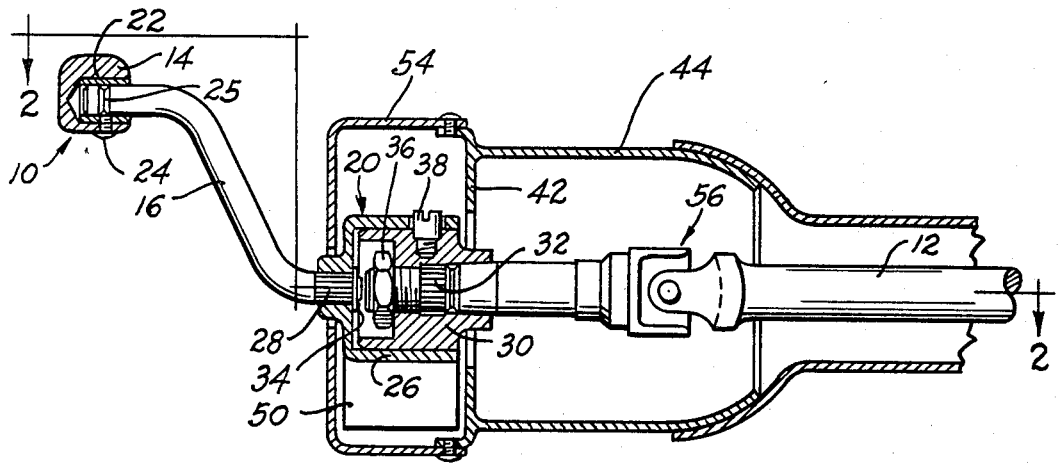
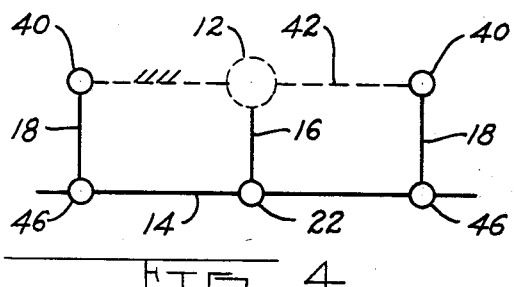
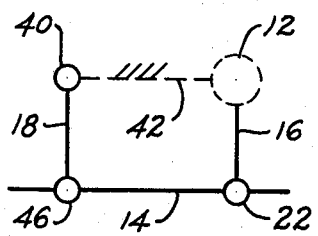
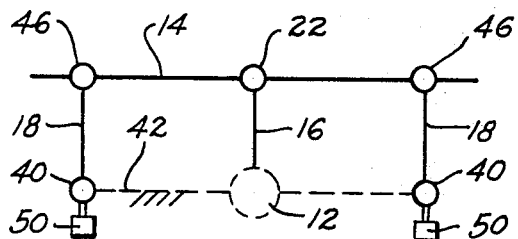
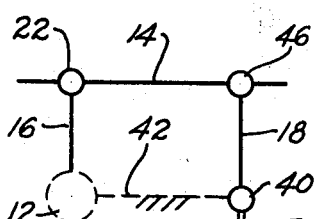
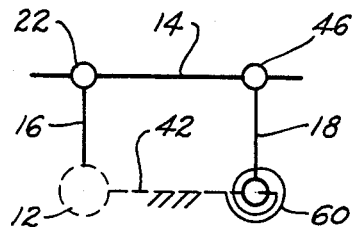
INVENTOR.
ARTHUR K BROWN JR
BY
*William N. Antonio*
ATTORNEY.

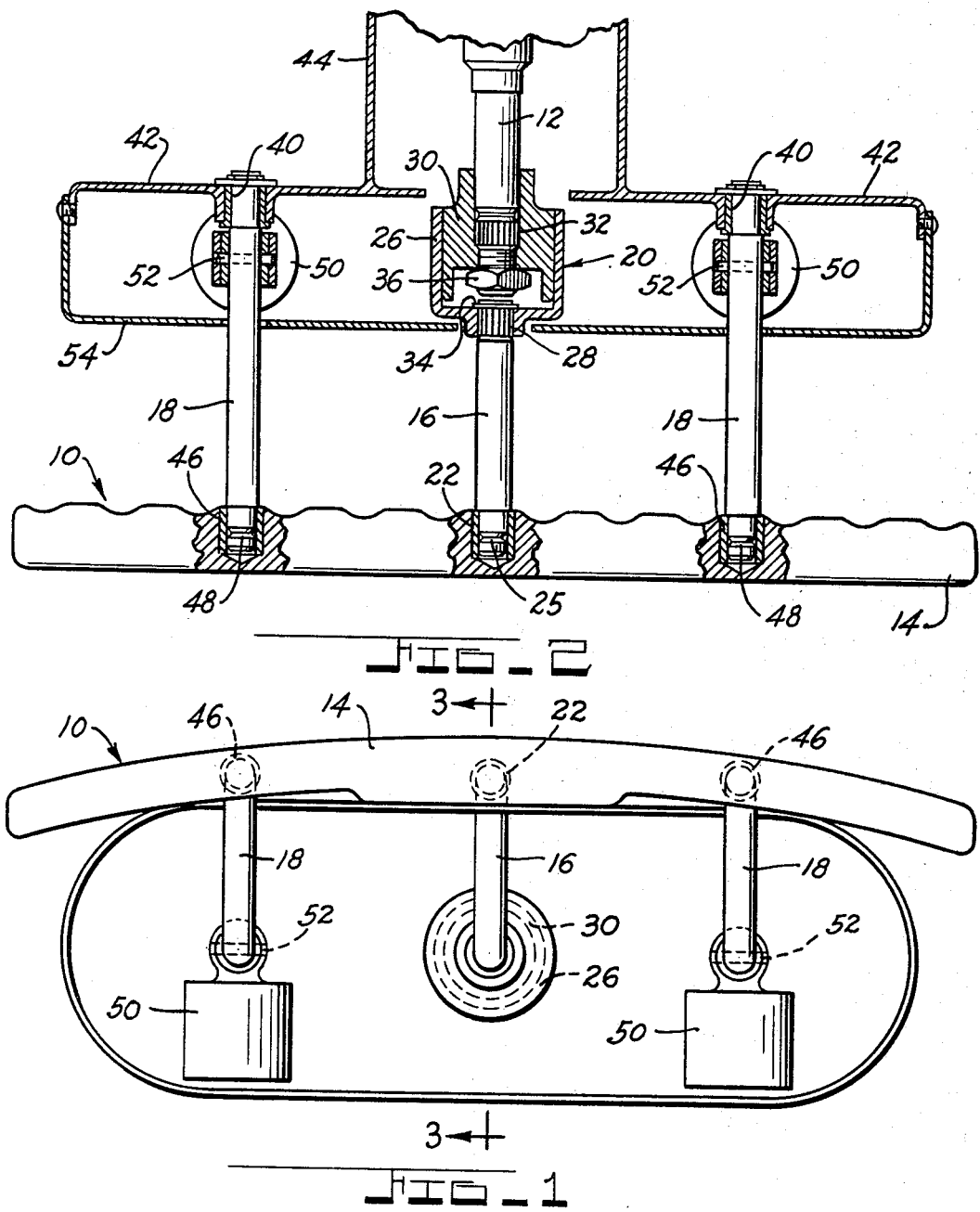

United States Patent Office 3,410,570
Patented Nov. 12, 1968

3,410,570
STEERING CONTROL MECHANISM
Arthur K. Brown, Jr., South Bend, Ind., assignor to The Bendix Corporation, a corporation of Delaware
Filed Jan. 12, 1967, Ser. No. 608,924
11 Claims. (Cl. 280—94)

ABSTRACT OF THE DISCLOSURE

The following relates to a parallel motion steering device which can be utilized as a replacement for the conventional steering wheel of an automotive ground vehicle. The device utilizes a four bar linkage arrangement wherein the parallel reciprocating motion of a manually operated steering bar is transformed into rotary motion of the vehicle steering shaft.

Background of the invention

Although a tiller bar was utilized in some of the first automotive ground vehicles, almost all such current and past vehicles have been steered by a steering wheel which is operatively connected to the steerable front wheels of the vehicle via a steering shaft, suitable reduction gearing and steering linkage. Even though current vehicles have incorporated some revolutionary changes, use of the steering wheel, to which operators have become accustomed, has continued due to the fact that vehicle manufacturers are hesitant because of safety considerations, to consider some other mode of steering. However, with the advent of power steering, which requires less manual steering effort, and more recently variable ratio steering, which requires less steering wheel movement for turning maneuvers, the disadvantages of the steering wheel greatly outweigh the advantages thereof.

Summary of the invention

Accordingly, it is an object of this invention to provide a steering control mechanism which is ideal for use with variable ratio steering.

Another object of this invention is to provide a steering control mechanism wherein the motion of the vehicle operator's hands and arms is somewhat similar to that which is required to rotate a steering wheel.

A further object of this invention is to provide a steering control mechanism which provides better visibility and comfort than the conventional steering wheel.

A still further object of this invention is to provide a steering control mechanism which can be counterbalanced for positive return to the center or neutral straight-ahead position.

Another object of this invention is to provide a steering control mechanism which, if desired, can be steered from either side of the front seat.

More specifically, it is an object of this invention to provide a steering control mechanism which includes a horizontally disposed manually operated reciprocable steering bar, a steering crank arm having one end thereof fixedly connected to the steering shaft and the other end thereof pivotally connected to said steering bar for causing rotation of said steering shaft upon movement of said steering bar, and a follower crank having one end thereof pivotally connected to a fixed portion of the vehicle and the other end thereof pivotally connected to the steering bar for providing substantially parallel movement of the steering bar.

Other objects and features of the invention will be apparent from the following description of the mechanism taken in connection with the accompanying drawings.

Brief description of the drawings

FIGURE 1 is a front plan view of the steering control mechanism with the cover portion of the steering shaft housing removed;

FIGURE 2 is a sectional view taken substantially along line 2–2 of FIGURE 3 with portions of the steering arm broken away for clarity;

FIGURE 3 is a sectional view taken substantially along line 3–3 of FIGURE 1; and FIGURES 4, 5, 6, 7 and 8 are schematic illustrations of various embodiments of the invention.

Description of the preferred embodiments

Referring to FIGURES 1, 2 and 3 it will be seen that a steering control mechanism, indicated generally by the numeral 10, is suitably connected to a conventional steering shaft 12 for steering the front steerable road wheels (not shown) of a vehicle. The steering control mechanism includes a horizontally disposed manually operated reciprocable steering bar 14 having a neutral straight-ahead position, a steering crank arm 16 for causing rotation of the steering shaft upon movement of the steering bar, and two follower crank arms 18 for providing substantially parallel movement of the steering bar.

One end of the steering crank arm 16 is fixedly connected to steering shaft 12 through means of a coupling, indicated generally by the numeral 20, whereas the other end of the steering crank arm is pivotally connected to the steering bar 14 through means of a self-lubricating sleeve type bearing 22. Withdrawal of the steering arm 14 from the crank arm 16 is prevented by a screw 24 which extends into a groove 25 formed on the steering crank arm. The coupling 20 includes a female member 26 which is splined at 28 to the steering crank arm 16 and a male member 30 which is splined at 32 to the upper portion of steering shaft 12. A snap ring 34 prevents withdrawal of the steering crank arm 16 from the female member 26, whereas a nut 36 threaded onto the upper portion of the steering shaft prevents withdrawal of the male member 30 therefrom. A set screw 38 prevents relative rotation between the male and female members of the coupling.

Each of the follower crank arms 18 has one end thereof pivotally connected to a fixed portion of the vehicle, through means of a self-lubricating sleeve type bearing 40 located in a radially extending portion 42 of the steering shaft housing 44, and the other end thereof pivotally connected to the steering bar, through means of a self-lubricating sleeve type bearing 46. A screw (not shown), similar to screw 24, extends into groove 48 formed on each of the follower crank arms for preventing withdrawal of the steering arm 14 therefrom. In order to return the steering bar 14 to its neutral straight-ahead position, a pendulum-like weight 50 is fixedly connected to each of the follower crank arms 18 through means of a pin 52. It will be understood, however, that the weight could also be attached to the steering crank arm rather than the follower crank arm. A cover 54 is suitably attached to the housing extension 42 for enclosing the weights and the ends of the crank arms. If desired, a universal joint 56, of the type disclosed in Runkle Patent No. 3,217,516, may be located in the steering shaft to permit angular adjustment of the steering bar 14.

Operation of the steering control mechanism will be as follows: If the vehicle operator desires to make a right turn, all that is necessary is for the operator to move the steering bar 14 in a rightward direction. Conversely, if the vehicle operator desires to make a left turn, it is only necessary to move the steering bar in a leftward direction. Such rightward or leftward linear movement of the steering bar will be transformed to rotary movement by the steering crank 16 so as to cause rotation of the steering shaft 12, said steering shaft being operatively connected to the steering wheels of a vehicle in a conventional manner. Accordingly, movement of the steering bar 14 away from its normally neutral position will cause rotation of the steering shaft 12 and consequent steering of the vehicle. Upon such movement of the steering bar the weights 50, which are fixedly connected to the follower crank arms, will be caused to move in a pendulum-like manner away from their normally vertical suspended position. The tendency of these weights to return to their normally vertical suspended position acts as a counterbalance which tends to return the steering bar to its normally neutral straight-ahead position. It will be obvious that during such steering operations the steering bar will always be horizontally disposed and will assume various parallel positions in a common plane. Furthermore, with variable ratio steering relatively small movements of the steering bar are needed to accomplish the desired vehicle turns, thus enabling the operator of the vehicle to continuously maintain his arms in a relaxed comfortable position. Another important aspect of this steering mechanism is the fact that utilization of the steering bar will provide better visibility for the vehicle operator than a conventional steering wheel without requiring drastic changes in the presently accustomed motion of the vehicle operator's arms and hands.

Referring to the schematic illustrations of the invention shown in FIGURES 4-8, it will be seen that the embodiment of FIGURES 1-3 is illustrated schematically in FIGURE 6. A similar embodiment, wherein only one follower crank arm 18 is utilized, is shown in FIGURE 7. In both of these embodiments the steering bar 14 is placed above the steering shaft 12. If desired, the steering bar may be placed below the steering shaft, as shown in FIGURES 4 and 5. However, in these latter two arrangements, turning of the vehicle to the right is accomplished by moving the steering bar to the left (rather than to the right, as in FIGURES 6 and 7), and turning to the left is accomplished by moving the steering bar to the right (rather than to the left as in FIGURES 6 and 7). It should be understood that in the embodiments shown in FIGURES 4 and 5, the weight of the linkage itself tends to return the steering mechanism to its normal straight-ahead position. Instead of utilizing a weight 50 as a return means for returning the steering bar to its neutral straight-ahead position, if desired, suitable spring means 60, shown schematically in FIGURE 8, could be utilized in place thereof. From the foregoing, it will be obvious to those skilled in the art that other four bar linkage steering arrangements could also be utilized. For example, although it is not deemed as desirable as the illustrated embodiments, the steering bar (or a pair of bars) could be arranged vertically with the necessary steering and crank arms so that vertical reciprocating movements would cause turning of the steering shaft. Another advantage of the horizontal steering bar is that, if desired, it can be made longer so that steering could be accomplished from either side of the front seat.

The several practical advantages which flow from this invention are believed to be obvious from the foregoing description, and other advantages may suggest themselves to those who are familiar with the art to which the invention relates.

Having thus described the various features of the invention, what I claim as new and desire to secure by Letters Patent is:

1. In a vehicle having a rotatable steering shaft adapted to be connected to a steerable road wheel, a steering control mechanism comprising a manually operated reciprocable steering bar having a neutral straight-ahead position, steering crank means operatively connected to said steering shaft and said steering bar for causing rotation of said steering shaft upon movement of said steering bar, and follower crank means operatively connected to a fixed portion of said vehicle and said steering bar for providing substantially parallel movement of said steering bar.

2. A steering control mechanism, as defined in claim 1, wherein said steering crank means includes a steering crank arm having one end thereof fixedly connected to said steering shaft and the other end thereof pivotally connected to said steering bar.

3. A steering control mechanism, as defined in claim 2, wherein said follower crank means includes a follower crank arm having one end thereof pivotally connected to a fixed portion of said vehicle and the other end thereof pivotally connected to said steering bar.

4. A steering control mechanism, as defined in claim 3, which includes return means operatively connected to said steering bar for returning said bar to its neutral straight-ahead position after movement away therefrom.

5. A steering control mechanism, as defined in claim 4, wherein said return means comprises a pendulum-like weight fixedly connected to one of said crank arms for rotation therewith.

6. A steering control mechanism, as defined in claim 5, wherein said pendulum-like weight is connected to said follower crank arm.

7. A steering control mechanism, as defined in claim 4, wherein said return means comprises spring means operatively connected to said steering bar and a fixed portion of said vehicle.

8. In a vehicle having a rotatable steering shaft adapted to be connected to a steerable road wheel, a steering control mechanism comprising a horizontally disposed manually operated reciprocable steering bar having a neutral straight-ahead position, a steering crank arm having one end thereof fixedly connected to said steering shaft and the other end thereof pivotally connected to said steering bar for causing rotation of said steering shaft upon movement of said steering bar, and a plurality of follower crank arms for providing substantially parallel movement of said steering bar, said crank arms each having one end thereof pivotally connected to a fixed portion of said vehicle and the other end thereof pivotally connected to said steering bar.

9. A steering control mechanism, as defined in claim 8, which includes return means operatively connected to said steering bar for returning said bar to its neutral straight-ahead position after movement away therefrom.

10. A steering control mechanism, as defined in claim 9, wherein said fixed portion of said vehicle is a housing for said steering shaft.

11. A steering control mechanism, as defined in claim 10, wherein said return means comprises a plurality of pendulum-like weights, one of which is fixedly connected to each of said follower crank arms for rotation therewith, said weights being located within said steering shaft housing.

References Cited

UNITED STATES PATENTS

| 1,522,491 | 1/1925 | Boswell | 74—495 |
| 2,667,939 | 2/1954 | Purkey | 280—87.1 X |

FOREIGN PATENTS

| 1,304,021 | 8/1962 | France. |

KENNETH H. BETTS, *Primary Examiner.*